Aug. 11, 1964　　　J. B. NICHOLS　　　3,144,223
AIRCRAFT LANDING GEAR
Filed April 11, 1962　　　　　　　　　　　4 Sheets-Sheet 1

INVENTOR.
John B. Nichols
BY Bialos & Schlemmer
Attorneys

Aug. 11, 1964   J. B. NICHOLS   3,144,223
AIRCRAFT LANDING GEAR

Filed April 11, 1962   4 Sheets-Sheet 2

INVENTOR.
John B. Nichols
BY Bialos & Schlemmer
Attorneys

INVENTOR.
John B. Nichols
BY Bialos & Schlemmer
Attorneys

Aug. 11, 1964   J. B. NICHOLS   3,144,223
AIRCRAFT LANDING GEAR
Filed April 11, 1962   4 Sheets-Sheet 4

INVENTOR.
John B. Nichols
BY Bislos & Schlemmer
Attorneys

United States Patent Office 3,144,223
Patented Aug. 11, 1964

3,144,223
AIRCRAFT LANDING GEAR
John B. Nichols, Atherton, Calif., assignor, by mesne assignments, to Hiller Aircraft Company, Inc., Menlo Park, Calif., a corporation of Delaware
Filed Apr. 11, 1962, Ser. No. 186,723
21 Claims. (Cl. 244—100)

This invention relates generally to landing gear structure for aircraft and more particularly to landing gear in which the energy of the shock and stress encountered when an aircraft engages a surface during landing is torsionally absorbed by the landing gear. The invention also relates to landing gear structure with is foldable or retractable during storage or flight, and with which varied type of landing surface engaging means are interchangeably usable. The present application is a continuation-in-part of copending application, Serial No. 52,255, filed August 26, 1960, for "Aircraft Landing Gear," and which was allowed October 19, 1961, now forfeited.

This invention has particular utility when embodied in the landing gear of helicopters and other vertical take off and landing aircraft. However, use of the disclosed torsional landing gear is not contemplated as being limited to helicopters in that the same could be used with other type aircraft which encounter high shocks and stresses during landing.

Heretofore, attempts have been made to absorb helicopter landing shock and stress by employing landing gear comprised of conventional springs, such as bendable leaf springs; or pneumatic landing gear, comprised of tires and similar air-filled bodies; or landing gear comprised of bendable metal tubes arranged transversely of the longitudinal axis of the aircraft to the ends of which depending means such as skids or the like are attached. Such prior art landing gears heretofore employed with helicopters and like aircraft have involved either the compression of air-filled bodies or the bending of spring type members. The subject landing gear employs neither the compression nor the bending principles of prior landing gear but rather employs a torsional principle for effectively absorbing landing shock and stress.

Objects of the present invention include the provision of torsion rod landing gear structure for a helicopter or like aircraft in which torsion rod sections are so arranged as to avoid interference below the chassis of the helicopter; the provision of such a landing gear which is selectively retractable or foldable; and the provision of such a landing gear in which components thereof may be selectively interchanged so that various types of landing surface engaging means may be selectively employed therewith, that is, so that skids, skis, wheels, floats or the like may be selectively employed. Other objects will become apparent from the following description.

Summarizing this invention the same relates to a light weight, high strength landing gear structure for a helicopter or like aircraft which comprises torsion rod structure as an important part thereof, such structure being adapted to absorb energy produced from the shock of an aircraft contacting a landing surface. In conjunction with the shock absorption function of the subject landing gear, and as a result of its novel construction, the subject landing gear may be retracted or folded selectively to conserve space during aircraft storage or to reduce drag during aircraft flight. Furthermore, depending upon the choice of material from which the torsion rod is produced, and the dimensions of the torsion rod employed, whether the same is solid or hollow, compensation may be made for landing shocks of various magnitudes. Additionally, structure is incorporated with the subject landing gear so that skids, skis, floats, wheels or other landing surface engaging means may be selectively employed therewith.

Of the prior art landing gear mentioned herein previously, perhaps the transverse bendable spring tubes have met with the most success. However, such transversely extending tubes absorb shock during landing strictly as a result of bending thereof. It has been found that bending is less efficient than torsional deformation as a means of shock absorption and that torsional landing gear is capable of greater shock absorption than conventional bendable landing gear.

With the subject torsion landing gear not only are advantages obtained in respect to shock absorption but, because of the construction thereof, various mechanical advantages also are provided, such as the aforementioned fact that retraction of the landing gear may be effected, that the gear has proportionally lower weight and greater strength than prior constructions, and that various landing surface engaging means may be selectively employed therewith.

Reference is directed to the accompanying drawings in which the subject landing gear structure is illustrated.

Figures 1, 2:
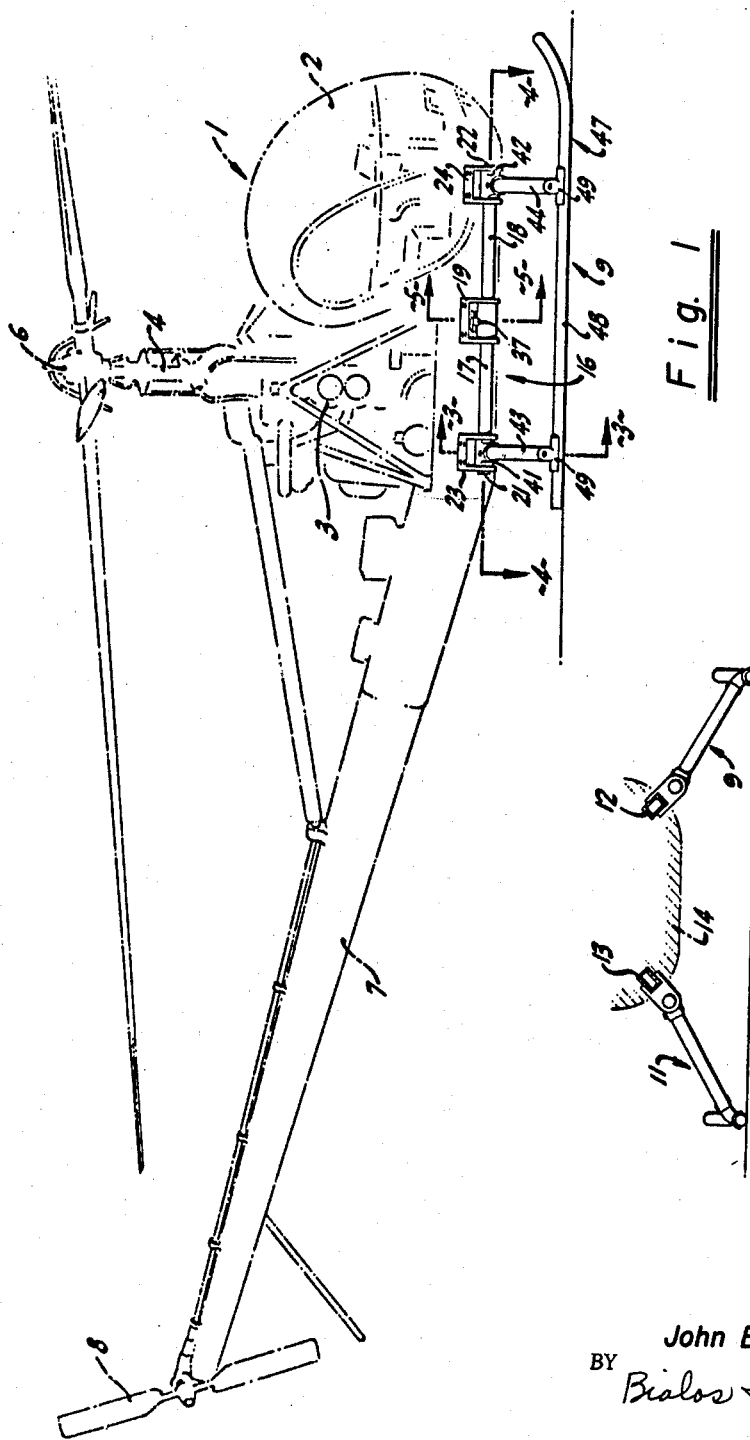
FIG. 1 is a side elevational view of a helicopter type aircraft illustrated more or less schematically in phantom lines to which the subject torsion rod landing gear is attached.
FIG. 2 is a partial end elevational view of a helicopter illustrating the attachment of the landing gear to the chassis thereof.

While, as noted previously, the subject landing gear structure may be employed on aircraft other than helicopters, for the purpose of illustration herein, and because the invention is particularly well suited for use with helicopters, the same is shown in the drawings attached to a helicopter 1 which, as shown in FIG. 1, comprises a pilot's compartment 2, an engine 3, a rotor column 4 extending upwardly from the engine which is topped by a rotor head and blade assembly 6, and a tail boom 7 with tail rotor 8 operatively positioned thereon.

In the embodiment shown in FIGS. 1 to 3, the landing gear structure illustrated advantageously incorporates landing surface engaging means of the so-called skid type, but, as will be pointed out hereinafter, various other landing surface engaging means also may be employed. The subject landing gear structure desirably comprises a pair of cooperable substantially identical shock absorbing portions or halves 9 and 11 at the respective sides of the chassis of the helicopter, as shown in FIG. 2, each of which preferably is divided into two operatively independent sections as will be described hereinafter. Only portion 9 of the landing gear structure at one side of the helicopter will be specifically described but it should be understood that its counterpart portion 11 at the opposite side desirably is identical therewith. As shown in FIG. 2, each landing gear portion 9 and 11 is secured to a respective structural member 12 and 13 which comprise part of the aircraft chassis and which extend generally parallel to each other longitudinally of the aircraft adjacent the underside 14 thereof.

Figure 3:
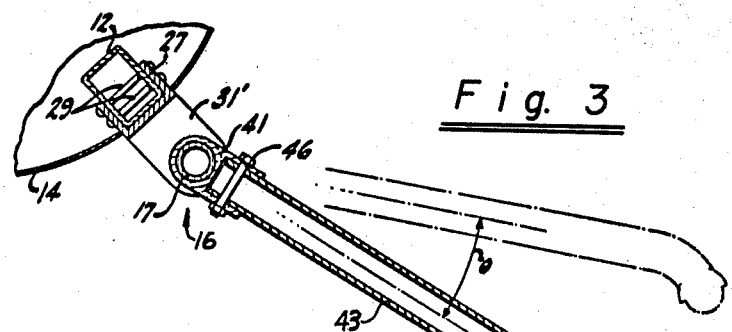
FIG. 3 is a generally vertical sectional view of a portion of the landing gear taken in the plane of line 3—3 of FIG. 1, on an enlarged scale.
Figure 4:
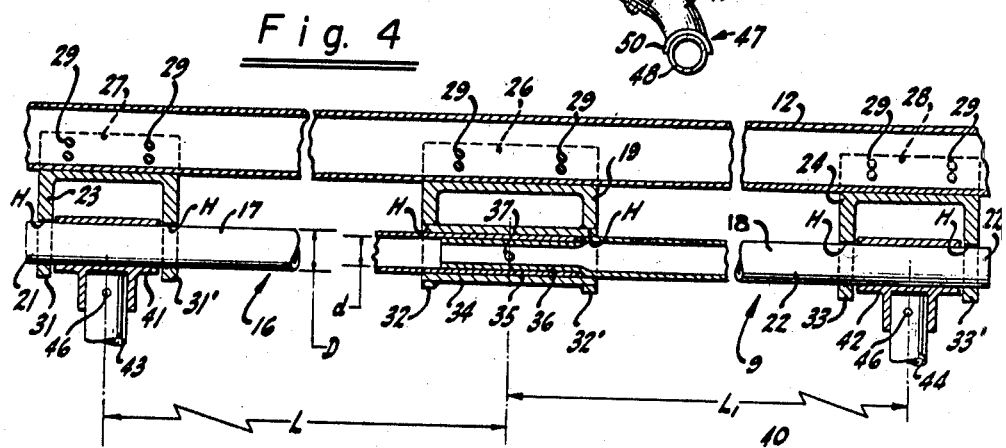
FIG. 4 is a horizontal sectional view through a portion of the landing gear taken in the plane of line 4—4 of FIG. 1, on an enlarged scale.

Referring to FIGS. 3 and 4, that portion 9 of the landing gear which will be specifically described comprises torsion rod structure 16 which extends generally longitudinally of the aircraft along the underside 14 thereof. In effect, as will be described hereinafter, rod structure 16 comprises two operatively distinct rod sections 17 and 18 which extend in opposite directions from an intermediate reference location at which the rod structure is operatively and non-rotatably secured to the aircraft chassis. The means for securing or fixing rod structure 16 to the chassis comprises a mounting bracket 19. The respective opposite outer ends 21 and 22 of rod sections 17 and 18 are positioned in and supported by bearing means in the form of bearing brackets 23 and 24 respectively, which also are secured to the aircraft chassis on opposite sides of intermediate bracket 19. In distinction to the non-rotatable, fixed engagement of the rod structure in bracket 19, the ends 21 and 22 of the respective rod sections 17 and 18 are free to rotatably twist in their respective brackets 23 and 24 for the purpose to become apparent.

Each of the brackets 19, 23 and 24 comprises an upper end which is fork-shaped, such upper ends being designated 26, 27 and 28 respectively, each of which is dimensioned to snugly engage and to at least partially surround the structural member 12 of the aircraft chassis at predetermined spaced locations therealong. While various means may be employed for securing the brackets to the structural member, series of bolts 29 are well suited for this purpose. Similarly, rivets, screw fasteners or welds could be employed.

Each bracket is defined at its lower end by a pair of spaced arms through which aligned rod receiving holes H are provided. The arms of the respective brackets 23, 19 and 24 are designated 31, 31'; 32, 32'; and 33, 33'. A tubular sleeve 34 extends between the arms of the intermediate bracket 19 and is welded or otherwise non-rotatably engaged therein.

Figure 7:
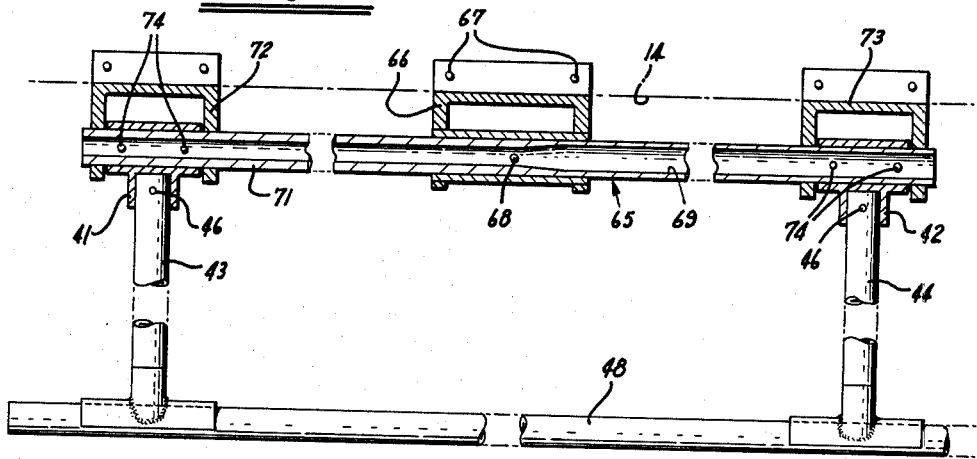
FIG. 7 is a fragmentary longitudinal schematic view partly in section and partly in elevation illustrating a modified landing gear structure embodying the principles of the invention.

In the embodiment of the invention illustrated in FIG. 4, torsion rod structure 16 is defined by two separate hollow tubes, each of which comprises one of the rod sections 17 and 18 mentioned previously. The inner ends 35 and 36 of such tubes are slidably interfitted with each other by reducing the outside diameter of the end of tube 18 to correspond substantially to the inside diameter of tube 17. While in this embodiment two separate torsion bar sections are employed, it should be evident that one continuous section could similarly be employed without departing from the scope of the invention, as is illustrated in FIG. 7. If one such torsion bar were employed, and non-rotatably held intermediate its ends as shown, the single bar would function generally in the same manner as the two separate sections illustrated in FIG. 4.

Figure 5:
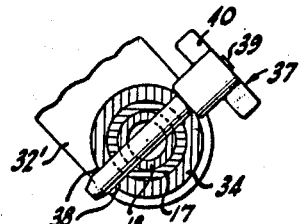
FIG. 5 is a vertical sectional view taken through a central portion of the landing gear in the plane of line 5—5 of FIG. 1, on an enlarged scale.

Desirably, removable means are employed for operatively connecting the inner ends of the tube sections to preclude relative rotation therebetween and rotation thereof relative to sleeve 34 and bracket 19. However, permanent securing means, such as welding, also could be used if preferred. Such removable means may comprise a threaded bolt type fastener but desirably a quick release pin 37 of the type shown in FIG. 5 is employed. Such pins are well known in the aircraft industry and various modifications thereof are commercially available. Such a pin employs opposite ball detents 38 which are projectable laterally adjacent one end of the pin. Positioning of the detents is controlled generally by a spring urged plunger 39 which is finger operated and extends from the head 40 of the pin. Upon depressing the plunger 39, the ball detents 38 are allowed to withdraw into the body of the pin so that the pin shank may be inserted through diametrically opposite aligned apertures provided through the interfitted ends of rod sections 17 and 18 and sleeve 34.

When plunger 39 of pin 37 is released, the ball detents 38 are urged laterally outwardly to engage an outer surface of sleeve 34 to preclude accidental pin removal and to non-rotatably unite the rod sections 17 and 18 with the sleeve as shown in FIG. 5.

With this construction, the axis of the pin 37 defines one extremity of the effective length of each section of the torsion rod structure and it is about such axis that the respective torsion bar sections 17 and 18 are twistable during absorption of landing gear shock. In the embodiment shown in FIG. 4, the effective lengths, diameters and the like of each rod section are the same so that the torsional resistance and strength of each section is generally the same. However, it should be understood that modifications in this regard can be effected if found desirable so that the torsional characteristics of each section may be made to differ.

As best seen in FIG. 4, the opposite outer ends 21 and 22 of the torsion bar sections are twistably journalled in their respective brackets 23 and 24. Mounted adjacent the opposite ends of the bar sections are socket members 41 and 42 which are welded or otherwise non-rotatably and fixedly connected thereto. Strut members 43 and 44 are slidably and removably received in each of the respective socket members and depend outwardly laterally therefrom when the landing gear is in the landing position.

Desirably, means such as a threaded bolt 46 or an other easily removed fastening device is extended through aligned holes provided in the socket member and in the upper end of each strut as shown in FIG. 3 to fixedly secure the strut in the socket member. If desired, quick release pins of the type described previously could be employed for removably retaining the struts in the respective socket members. It is thus seen that each strut is fixedly and rigidly secured directly to a torsion rod section adjacent an end thereof so that it can not rotate or turn with respect to such torsion rod section.

At the lower end of each strut, landing surface engaging means 47 is provided. As noted previously, in the embodiment illustrated in FIGS. 1 to 3, such landing surface engaging means is of the well known skid type which is defined by an elongated tubular member 48 which extends between the respective rear and front struts 43 and 44 and is secured thereto by bolting, welding or the like. In the embodiment illustrated, a connector 49 is received in each strut lower end and includes a pad 50 which is welded to the tubular skid 48. Each connector 49 is bolted or otherwise secured to the lower end of the strut as, for example, by a fastener 51.

Because each torsion rod structure on each side of the aircraft is precluded from anything other than twistable movement about an intermediate fixed point due to engagement of a pin 37 with a sleeve 34 in a bracket 19, upon contact of the skid 48 with a landing surface, each of the struts will be moved upwardly and laterally due to the weight of the aircraft thereby causing twisting or torsional movement of the respective rod sections 17 and 18 about the axis of the rod structure. Depending upon the force or shock imparted by the landing, the struts will move through a predetermined angle $\theta$ with a shock absorbing rubbing action on the ground as illustrated in FIG. 3. It should be understood therefore that the shock of landing will be absorbed by the twisting movement of the respective rod sections 17 and 18.

Since each of the struts 43, 44 at each side of the aircraft has a rigid connection at its upper end with the respective torsion rod sections 17, 18, geometric stability is established by the torsion rods which thus serve as the sole support for the aircraft on the ground and as the shock absorbing means upon landing of the aircraft. Consequently, no inwardly extending linkage system is required between the struts and the chassis of the aircraft to restrain the struts, as would otherwise be the case were the struts pivotally of rotatably connected to intermediate levers or links in turn rigidly connected to the respective torsion rods.

Moreover, since the need for such linkages is obviated, the entire internal space underneath the aircraft chassis between the struts at the respective sides of the aircraft is completely clear and unimpeded as can be seen from FIG. 2. As a result, reasonably large objects, such as stumps of trees and rocks, which might be present on rough terrain, will offer no interference during landing. That is, because of the absence of linkages and levers between the struts on opposite sides of the chassis, the helicopter can straddle tree stumps, rocks and the like during landing on rough terrain.

While in the embodiment illustrated in FIGS. 1 through 5 of the drawing, the respective rod sections 17 and 18 are of hollow tubular construction to minimize landing gear weight, the rod sections could be solid also. Furthermore, while the effective lengths L and $L_1$ of the respective rod sections 17 and 18 are substantially equal in such embodiment, it should be appreciated that the effective lengths L and $L_1$ of the respective sections could be modified so that the torsional strength and stiffness of one rod section may be made selectively greater or less than that of the other rod section. Also, the relative torsional stiffness of the two rod sections can be made to differ by employing materials of different characteristics or by employing tubes having different internal and external dimensions, D and d respectively (FIG. 4), so that the respective wall thicknesses thereof are different. Also, various combinations of these expedients may be employed so that substantially any particular need may be met.

Figure 6:
FIG. 6 is a side elevational view similar to FIG. 1 illustrating a modified landing gear structure.

A further important feature of this invention resides in the fact that landing surface engaging means of various types may be easily interchanged with the torsion bar structure. That is, by removing the aforementioned struts 43 and 44 and the attached skid 48 from engagement with the respective socket members 41 and 42 of the torsion bar structure, and by substituting other struts therefor which have secured to the lower ends thereof landing surface engaging means of a different type than the skid type illustrated, the aircraft may be adapted for landing on various types of landing surfaces. In FIG. 6 for example, struts 56 and 57, which have wheels 58 and 59 connected to the lower ends thereof, may be interchangeably employed. Similarly, if it is desired to adapt the aircraft for landing on water, well known pontoons or floats may be attached to the aircraft merely by inserting struts to which the pontoons are connected into the socket members provided. Similarly, skis or other type gear may be connected to the aircraft for adapting the same to land on snow or the like.

Yet another important feature of this invention resides in the fact that the subject landing gear structure is adapted to be retracted to conserve space during storage or to reduce drag during flight. That is, when the pin 37 is removed from engagement with the interfitted ends of the respective torsion bar sections, the landing gear structure as a unit is free to rotate in the brackets to a position underlying the aircraft or lying alongside thereof in a generally upright position. Such retraction or folding may be effected manually, or, if desired, hydraulic mechanism to automatically control such retraction could be employed.

As a result, additional advantages over and above the improved landing shock absorbing characteristics of the subject landing gear also are available from use thereof.

In torsion rod structures of the type illustrated, the torsional spring characteristics of each rod section are generally determined by the following factors: the modulus of elasticity (shear modulus) of the material chosen; the effective length of each rod section; and the wall thickness and outside diameter of the rod chosen, if hollow, or the outside diameter of the rod chosen, if solid.

The following classical torsion stress equations mathematically relate these factors to each other so that a determination of maximum landing stress and shocks for a given aircraft may be determined as well as the characteristics of a given torsion rod spring.

The angle, $\theta$ through which a torsion rod section is twistable by torque, T, applied to a landing gear strut is:

$$\theta = \frac{TL}{EsJ}$$

where

L = effective length of torsion rod
Es = modulus of elasticity of the material in torsion
J = torsional (Polar) moment of inertia The torsional moment of inertia J for a tubular rod is given as:

$$J = \frac{\pi}{32}(D^4 - d^4)$$

where:

D = outside diameter of tube
d = inside diameter of tube

In case of a solid rod where $d=0$ $$J = \frac{\pi}{32}D^4$$

The maximum stress of the material is given by:

$$S = \frac{TR}{J}$$

where R = maximum radius of tube $$\left(\frac{D}{2}\right)$$

While it should be appreciated that the subject invention may be employed on aircraft of various sizes and types, one specific example of dimensions intended for purposes of explanation only and which should not be considered in any way limiting, will be described with reference to FIGS. 1 through 5. For example, in a helicopter type aircraft the gross weight of which is approximately 3,000 pounds, suitable torsion rod structure could embody the following: the effective length L and $L_1$ of the respective front and rear torsion rod sections on each side of the aircraft desirably is 30 inches. Such length is defined by the distance between the axis of removable pin 37 and the axes of the respective front and rear struts 43 and 44. If a high alloy steel is employed, such as a chromium-molybdenum SAE 4130 steel, an outside diameter for each tube section of 1.983 inches and an inside diameter of 1.597 inches, thereby giving a tubular wall thickness of .193 inch, has been found suitable. The modulus of elasticity (shear modulus) of such an alloy steel is approximately 12 million pounds per square inch.

With the subject example, if it were desired to make the rear tubular rod section of the landing gear stronger or more resistant to torsional twisting, the same could easily be done by employing a tubular rear section having a greater wall thickness than the wall thickness of the front section, such as a wall thickness of .262 inch. Other arrangements as herein noted also could be employed for modifying the torsional spring characteristic of the front and rear torsion rod sections.

In the embodiment shown in FIGS. 1 through 5, an integral one piece bracket structure 19 is employed for providing in effect a bracket for each rod section 17 and 18 in which each section is fixedly secured by pin 37. Separate brackets may, however, be employed.

FIGS. 7 through 11 illustrate additional embodiments of the invention incorporating the principles previously described wherein the helicopter torsional landing gear structure is at each side of the helicopter and is so arranged to provide an internal space between the landing gear struts which is clear and unimpeded under the chassis of the aircraft, in the manner illustrated in FIG. 2. In all embodiments, the body or chassis 14 of the helicopter is indicated by the phantom line to which reference numeral 14 is applied; and with respect to parts similar to that previously described, the same reference numerals are also applied.

In the FIG. 7 embodiment, an integral one piece torsion rod 65 is employed which is in the form of a metal tube. Such rod is secured in bracket 66 rigidly attached to the aircraft chassis by suitable means such as bolts 67; the securing means employed being desirably a quick release pin 68 similar to the pin 37 described with respect to the FIGS. 1 through 5 embodiment.

Rod 65 at one side of pin 68 has a larger interior diameter to provide a rod section 69 of different torsional characteristics than rod section 71 which is of lesser interior diameter. Rod section 71 is journalled for twisting movement in bracket 72 bolted or otherwise secured to the helicopter chassis, while rod section 69 is similarly journalled in bracket 73 bolted or otherwise secured to the helicopter chassis. The respective struts 43 and 44 are rigidly secured in respective socket members 41 and 42 by means of the previously described releasable fastening means such as bolts 46. The collars of the socket members 41 and 42 are rigidly and non-rotatably secured to the respective rod sections 69 and 71 by suitable means, such as removable pins 74, or by welding. Desirably, skid type landing members 48 are secured to the respective outwardly and laterally extending struts 43 and 44 as previously described.

Figure 8:
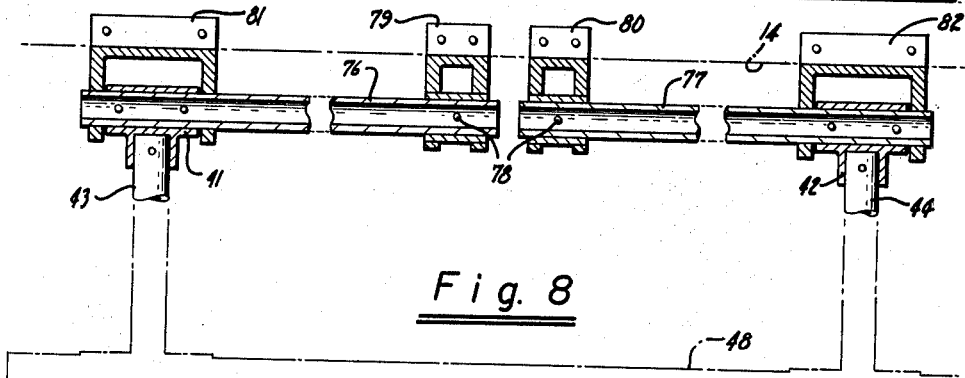
FIGS. 8, 9, 10 and 11 are views similar to FIG. 7 illustrating further embodiments.

The FIG. 8 embodiment is generally quite similar to the FIG. 4 embodiment. It comprises two rod sections 76 and 77 each of which is secured at its inner end by suitable release pins 78 of the type described in one of a pair of independent or separate brackets 79 and 80 which are bolted or otherwise secured to the helicopter chassis. The outer ends of rod sections 76 and 77 are twistably journalled in respective brackets 81 and 82 in the manner previously described. Struts 43 and 44 are secured in the collars of socket members 41 and 42, also in the manner described, which members in turn are fixedly secured to the outer ends of the rod sections 76 and 77. A landing skid 48 also desirably is secured to the lower ends of the struts 43 and 44.

Figure 9:
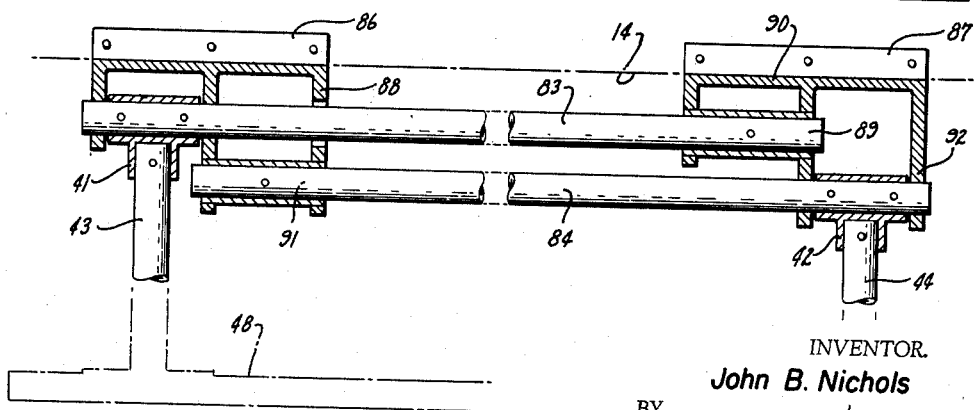

In the FIG. 9 embodiment, two parallel rod sections 83 and 84 are employed with one being arranged generally above the other. Similar brackets 86 and 87 are rigidly bolted or otherwise secured to the helicopter chassis 14. One rod section 83 is rigidly secured adjacent one end thereof in socket member 41 to which strut 43 is secured. Rod section 83 extends through and is journalled in an apertured portion 88 of bracket 86 and is rigidly secured at its opposite end 89 in an apertured portion 90 of bracket 87. Being thus secured at one end in bracket 87, rod section 83 is adapted for twisting at the opposite end to which strut 43 is secured.

The other rod section 84 is rigidly secured at one of its ends 91 in apertured portion 88 of bracket 86. The opposite end of rod section 84 is journalled for twisting in apertured portion 92 of the other bracket 87. Strut 44 is rigidly secured at its upper end to rod section 84 by means of socket member 42 in the manner already described; and preferably a landing skid 48 is secured to the lower ends of struts 43 and 44.

Figure 10:
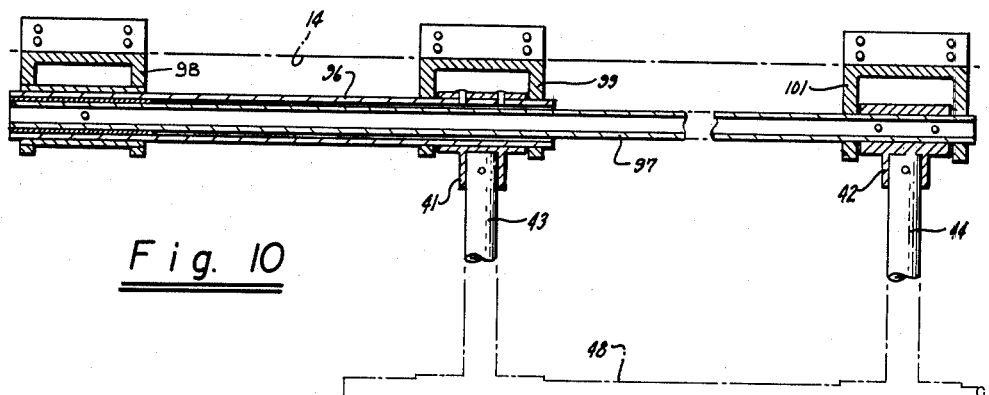

The FIG. 10 embodiment comprises an exterior hollow rod section 96 through which concentrically extends a smaller diameter rod section 97. Corresponding ends of both rod sections 96 and 97, the left hand ends appearing in FIG. 10, are rigidly and non-rotatably secured in bracket 98 which in turn is bolted or otherwise rigidly secured to the chassis 14. The opposite end of outer rod section 96 is journalled for twisting movement in bracket 99 bolted or otherwise secured to the chassis. Socket member 41 is rigidly secured to rod section 96, desirably by bolts, as shown, or by welding, and the upper end of strut 43 is securely received in such socket member. Rod section 97 extends beyond the end of rod section 96 and is twistably journalled in bracket 101 secured to the chassis. Socket member 42 is rigidly secured to the end of rod section 97 and strut 44 is in turn rigidly connected with the socket member. By having inner and outer rod sections thus telescoped one within the other, since one section is longer than the other and the sections are of different diameters, various torsional characteristics can be obtained depending upon the result desired.

Figure 11:
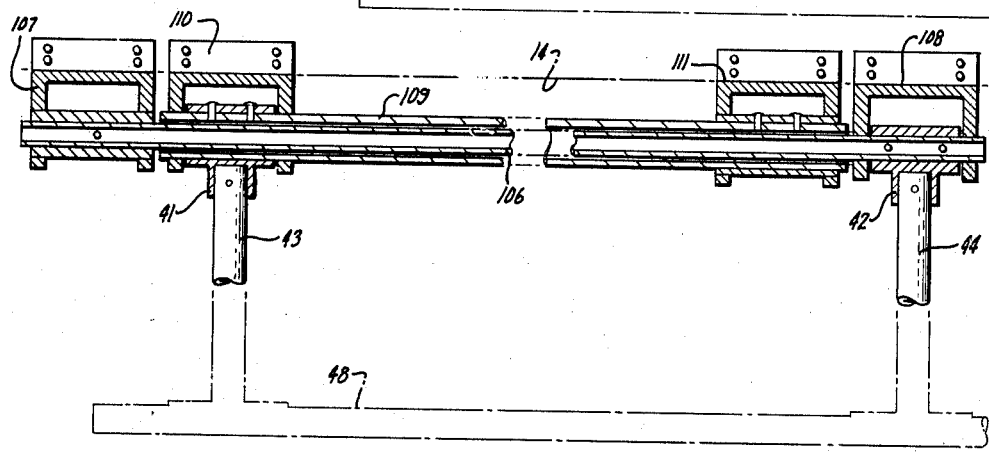

The arrangement of FIG. 11 also comprises concentric rod sections, the inner rod section 106 being rigidly secured adjacent one end thereof in bracket 107 secured to the aircraft chassis. The opposite end of inner rod section 106 is twistably journalled in bracket 108 with strut 44 being secured to the rotatable end of rod section 106 by means of socket member 42 in the manner described. The outer rod section 109 is journalled in bracket 110 rigidly secured to the aircraft chassis and is desirably bolted, as shown, or welded to socket member 41 in which strut 43 is rigidly secured. The opposite end of outer rod section 109 is rigidly secured against rotation, desirably by bolts, as shown, or by welding in bracket 111 secured to the chassis 14. As in the previously described modifications, a landing skid desirably is secured to the lower ends of struts 43 and 44 at each side of the aircraft.

In all the described modifications, it will be noted that each strut is rigidly secured directly to a rod section adjacent one end of the rod section so that the strut cannot rotate or turn with respect to such rod section. The other end of each such rod section in turn is rigidly fastened to the aircraft. Thus, as was true with respect to the modification of FIGS. 1 through 5, the torsion rod structures at opposite sides of the aircraft are free of direct interconnection with each other beneath the aircraft chassis and provide by themselves the stability required so that an unrestricted space is provided underneath the aircraft chassis. That is, no connecting linkage is required between the opposite rod structures of the landing gear for the reasons previously described.

Figure 12:
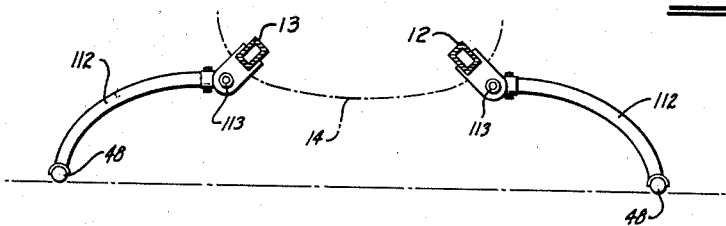
FIG. 12 is a schematic view similar to FIG. 2 illustrating an embodiment wherein the landing gear struts are arched outwardly to provide enhanced clearance.

In the FIG. 12 embodiment, which is applicable to all the foregoing described modifications, increased clearance between the skids 48 of the opposite torsion rod structures may be obtained by providing outwardly bowed struts 112 which are rigidly secured at their upper ends to the respective torsion rod sections 113 by means of any of the arrangements previously described.

Although skids have been found most advantageous with the landing gear structure modifications of the character described, particularly in combination with a helicopter, other landing surface engaging means, such as shown in FIG. 6 and described previously, may be employed at the lower ends of the struts.

From the foregoing, it should be understood that an aircraft landing gear has been devised which is more resistant to shock and landing stresses; which is more capable of absorbing landing shock than is true of prior art bendable type landing gear heretofore employed; and which, at the same time, does not increase landing gear weight.

Having made a full disclosure of this invention, attention is directed to the appended claims in light of which the invention should be interpreted.

I claim:

1. In combination with a helicopter which includes a chassis, torsional landing gear structure comprising an elongated landing shock-absorbing rod extending generally longitudinally of said chassis, a bracket immovably secured to said chassis, a predetermined portion of said rod being located in said bracket and operatively secured therein, an end of said rod being spaced from said bracket and being twistable about the axis of said rod, a depending strut fixedly and non-rotatably secured at its upper end to said rod adjacent said rod end, and landing surface engaging means connected to the lower end of said strut, said rod being torsionally twistable about its axis but retained against bending upon contact of said means with said landing surface for absorbing shock when said helicopter lands upon said surface.

2. A helicopter comprising a chassis, and torsional shock-absorbing landing gear normally depending from said chassis for absorbing landing shock and for supporting said helicopter on a landing surface; said landing gear comprising a torsion rod structure secured to said chassis, said structure comprising a pair of operatively distinct torsion rod sections extending generally longitudinally of said chassis, each of said rod sections being non-rotatably secured at a predetermined location therealong in mounting bracket means which in turn is fixedly secured to said chassis, an end portion of each rod section spaced from such predetermined location thereof being journalled for torsional twisting in bearing bracket means which in turn is fixedly secured to said chassis, each rod section thereby being mounted for twisting about its axis independently of the other section, a strut fixedly and non-rotatably connected with each of said rod sections, said struts extending generally laterally of said respective rod sections in generally the same direction relative thereto, and means on the lower ends of said struts for engaging a landing surface when said helicopter is landed on such surface.

3. In combination with a helicopter which includes a chassis, torsional landing gear secured to said chassis, said landing gear comprising a pair of torsion rod structures extending generally longitudinally of said chassis; each of said structures comprising a pair of torsion rod sections, each said section being fixedly and non-rotatably secured adjacent one of its ends to said chassis, the other end of each said rod section being journalled for torsional twisting about the axis of such section, a strut associated with and depending from each of said rod sections, each said strut being rigidly fixed and non-rotably secured operatively with its associated rod section, and landing surface engaging means on the lower ends of said struts; said torsion rod structures being torsionally twistable independently of each other upon contact of said landing surface engaging means with a landing surface for torsionally absorbing shock of landing said helicopter upon said surface, the struts and landing surface engaging means of the respective rod structures being free of interconnection with each other beneath said helicopter.

4. The helicopter combination of claim 3 in which the respective rod sections of said rod structures have dissimilar torsional characteristics.

5. In combination with a helicopter which includes a chassis, torsional landing gear secured to said chassis, said landing gear comprising a pair of torsion rod structures extending generally longitudinally of said chassis, each of said rod structures comprising a torsion rod section, each of said rod sections being fixedly and non-rotatably secured at a predetermined location along such section to said chassis, an end portion of each said rod section spaced from such predetermined location thereof being journalled for torsional twisting relative to said chassis, each rod section thereby being mounted for twisting about its longitudinal axis independently of the other section, strut means fixedly and non-rotatably connected with each of said rod sections, and a pair of landing gear skids on the lower end of said strut means for engaging a landing surface when said helicopter is landed on such surface; the respective strut means and skids of the respective rod structures being free of interconnection with each other beneath said chassis whereby the space beneath said chassis between said rod structures is unobstructed by connecting linkages and the like.

6. In combination with a helicopter which includes a chassis, torsional landing gear secured to said chassis, said landing gear comprising a pair of torsion rod structures extending generally longitudinally of said chassis adjacent opposite sides thereof, each of said rod structures comprising a pair of operatively distinct torsion rod sections, each of said rod sections being fixedly and non-rotatably secured at a predetermined location along such section to said chassis, an end portion of each said rod section spaced from such predetermined location thereof being journalled for torsional twisting relative to said chassis, each rod section thereby being precluded from bending and being mounted for twisting about its longitudinal axis independently of the other section, a strut fixedly and non-rotatably connected with each of said rod sections, and landing surface engaging means on the lower end of each of said struts for engaging a landing surface when said helicopter is landed on such surface; the respective struts and landing surface engaging means of the respective rod structures being free of interconnection with each other beneath said chassis whereby the space beneath said chassis between said rod structures is unobstructed by connecting linkages and the like.

7. A helicopter comprising a chassis and torsional shock-absorbing landing gear depending from said chassis for absorbing landing shock and for supporting said helicopter on a landing surface, said landing gear comprising a pair of torsion rod structures extending generally longitudinally of said chassis positioned on the underside of said chassis and spaced laterally from each other thereneath, each of said rod structures being operatively secured with said chassis and being otherwise free of interconnection with each other whereby the space beneath said chassis between said rod structures is free of connecting linkages and like obstructions which could interfere with landing of said helicopter; each of said rod structures comprising a pair of operatively distinct torsion rod sections, connecting bracket means secured to said chassis, each of said rod sections being non-rotatably secured in said connecting bracket means, bearing bracket means also secured to said chassis, each of said rod sections being received in and journalled for twisting adjacent an end thereof in said bearing bracket means, and strut means depending laterally from and operatively connected with each of said rod sections, said strut means being rigidly fixed and non-rotatably secured with an associated rod section adjacent said end of such section which is journalled for twisting.

8. A helicopter including a chassis and landing gear depending from said chassis, said landing gear comprising means for absorbing shock and cushioning landing of said helicopter on a landing surface, including torsion rod structure extending generally longitudinally of said helicopter, means operatively and immovably securing said rod structure intermediate its opposite ends to said chassis, bearing means adjacent each of said rod opposite ends supporting such ends and permitting torsional movement therein relative to said chassis, a pair of struts secured to and depending from said rod structure adjacent said ends thereof, and landing surface engaging means positioned on the lower ends of said depending struts, said rod structure being twistable about its axis upon engagement of said engaging means with a landing surface during landing of said helicopter whereby shock attendant with such landing is torsionally absorbed and cushioned by said rod structure.

9. The helicopter of claim 8 in which said structure comprises an elongated hollow tube.

10. The helicopter of claim 8 in which said structure comprises an elongated solid rod.

11. The helicopter of claim 8 in which said rod structure is releasably engaged with said first mentioned means and is rotatable in such means when released so that said rod structure and the struts and landing surface engaging means secured thereto may be rotated about the axis of said rod structure to retract the same for storage, flight and the like.

12. A vertical take off and landing aircraft comprising a chassis, and torsional shock-absorbing landing gear normally depending from said chassis for absorbing landing shock and for supporting said aircraft on a landing surface, said landing gear comprising a pair of rod structures positioned on the underside of said aircraft; each of said structures comprising a torsion rod extending generally longitudinally of said aircraft chassis, a bracket immovably secured to said chassis, said rod being engaged with said bracket intermediate opposite ends of said rod, means engaged between said rod and said bracket and non-rotatably securing said rod to said bracket intermediate said opposite rod ends, spaced bearing brackets secured to said chassis on opposite sides of said first mentioned bracket, said rod opposite ends being torsionally journalled in said bearing brackets, struts depending from said rod adjacent each of said rod opposite ends, and landing surface engaging means secured to the lower end of each of said struts; each of said torsion rods being twistable about its axis upon contact of said engaging means with a landing surface, whereby shock is torsionally absorbed by said rods during aircraft landing.

13. The aircraft of claim 12 in which each of said torsion rods comprises two separate oppositely directed sections, the sections of each rod being operatively interfitted with each other at said first mentioned bracket.

14. The aircraft of claim 12 which includes means releasably securing said struts to their respective rod ends, whereby said struts are separable from said rods so that landing surface engaging means of various types engaged with different struts may be selectively employed with said aircraft.

15. The aircraft of claim 12 in which said means engaged between each of said rods and its respective first mentioned bracket comprises a removable pin which normally extends through such rod and such bracket to preclude rotation therebetween when said landing gear is in the depending position for aircraft landing, each pin when removed permitting rotation of each rod structure about the axis of each rod whereby retraction of said landing gear for storage and flight may be effected.

16. In combination with a rotary wing aircraft, landing gear structure comprising a torsion rod positioned generally on the underside and extending generally longitudinally of said aircraft, said torsion rod being clamped and secured to said aircraft at a predetermined location along the length of said rod, an end of said rod being twistable about the rod axis, a socket member secured to said rod adjacent said end and open laterally, a strut having one end thereof telescopically and removably received in said socket member, means disengageably retaining said one strut end in said socket member, and landing surface engaging means secured to the other end of said strut, said rod being torsionally deformable upon contact of said engaging means with a landing surface to absorb aircraft landing shock, said strut being telescopically disengageable laterally from said socket so that another strut having different landing surface engaging means connected thereto may be operatively engaged with said rod.

17. A vertical take off and landing aircraft comprising a chassis and landing gear structure in combination therewith for torsionally absorbing the shock of landing said aircraft upon a landing surface; said landing gear structure comprising a torsion rod structure extending generally longitudinally of said chassis, said rod structure being secured to said chassis intermediate opposite ends of said rod structure whereby said structure is divided into two operatively distinct sections, said sections being journalled for twisting movement but being precluded from bending relative to said chassis whereby each of said sections is torsionally twistable about its respective longitudinal axis, aircraft supporting means engageable with said landing surface depending from each of said rod sections and secured thereto adjacent opposite ends of said structure, each of said rod sections being twistable independently of the other section about the axis of said structure when said aircraft is landed upon said surface to absorb and cushion landing shock.

18. The aircraft of claim 17 in which said operatively distinct sections of said rod structure have dissimilar torsional characteristics.

19. A helicopter comprising a chassis, and torsional shock-absorbing landing gear normally depending from said chassis for absorbing landing shock and for supporting said helicopter on a landing surface; said landing gear comprising a pair of rod structures secured along the underside of said chassis; each of said rod structures comprising a torsion rod extending generally longitudinally of said chassis, a bracket immovably secured to said chassis, said torsion rod being engaged with said bracket intermediate opposite ends of said rod, means engaged between said rod and said bracket, spaced bearing brackets secured to said chassis on opposite sides of said first mentioned bracket, said rod opposite ends being torsionally journalled in said bearing brackets, struts depending from said rod adjacent each of said rod opposite ends, and landing surface engaging means secured to the lower end of each of said struts; each of said torsion rods being twistable about its axis upon contact of said engaging means with a landing surface, whereby shock is torsionally absorbed by said rods during helicopter landing; said means engaged between each said rod and each said bracket being operatively disengageable from the respective rods and brackets whereby said landing gear may be pivoted about the axes of the respective rods to a retracted position for storage or flight.

20. A helicopter comprising a chassis, and torsional shock-absorbing skid-type landing gear normally depending from said chassis for absorbing landing shock and for supporting said helicopter on a landing surface; said landing gear comprising a pair of laterally spaced rod structures extending longitudinally of and secured along the underside of said chassis; each of said rod structures comprising an elongated torsion rod, a mounting bracket secured to said chassis through which said torsion rod extends, means engaged between said rod and said bracket for normally precluding said rod from rotating in said mounting bracket, said rod including operatively distinct torsion sections on opposite sides of said mounting bracket, a pair of spaced bearing brackets secured to said chassis on opposite sides of said mounting bracket, each of said distinct rod sections being twistably journalled in a bearing bracket for torsional twisting about a longitudinal axis relative to said mounting bracket, a strut depending laterally from each of said rod sections, and a landing skid extending between and secured to each of said struts; the landing skids of said landing gear being operative independently of each other during landing of said helicopter.

21. The helicopter of claim 20 in which the distinct sections of each torsion rod of said pair of rod structures have torsional shock absorbing characteristics which are different from each other, whereby one rod section of each torsion rod is more or less resistant to torsional twisting than the other rod section.

References Cited in the file of this patent
UNITED STATES PATENTS

| | | |
|---|---|---|
| 2,582,426 | Greene | Jan. 15, 1952 |
| 2,641,423 | Harriman | June 9, 1953 |
| 2,954,188 | O'Connor | Sept. 27, 1960 |